Patented Aug. 2, 1949

2,477,617

UNITED STATES PATENT OFFICE 2,477,617

PREPARATION OF 1,4-DICYANO-2-BUTENE FROM 3,4-DIHALO-1-BUTENE AND MIXTURES CONTAINING SAME

John R. Johnson, Ithaca, N. Y., and Gerald M. Whitman, Claymont, Del., assignors to E. I. du Pont de Nemours & Company, Wilmington, Del., a corporation of Delaware No Drawing. Application August 12, 1947, Serial No. 768,284

14 Claims. (Cl. 260—465.8)

1

This invention relates to organic nitriles and more particularly to a process for preparing 1,4-dicyano-2-butene, a recently synthesized compound having the formula

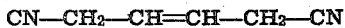

CN—CH$_2$—CH=CH—CH$_2$—CN which may also be referred to by the name $\Delta^\beta$-dihydromucononitrile.

This application is a continuation-in-part of our application Serial Number 696,358, filed September 11, 1946, now abandoned.

Preparation of 1,4-dicyano-2-butene has been proposed by reacting a 1,4-dihalo-2-butene with an alkali or alkaline earth metal cyanide. This method is disclosed in U. S. Patent 2,342,101, issued February 22, 1944. Improved methods of preparing 1,4-dicyano-2-butene in excellent yields from 1,4-dihalo-2-butenes are described in application for patent Serial No. 768,283 filed concurrently with this application by Gerald M. Whitman, one of the co-inventors herein. These methods involve the reaction of a 1,4-dihalo-2-butene with hydrogen cyanide under non-alkaline conditions.

In all of these methods, the starting material is a 1,4-dihalo-2-butene, preferably 1,4-dichloro-2-butene. 1,4-Dichloro-2-butene is prepared most conveniently and economically by limited chlorination of 1,3-butadiene, or of a gaseous mixture containing 1,3-butadiene, under conditions designed to minimize formation of tetrachlorobutane, as described for example in U. S. Patents 2,038,593, issued April 28, 1936, and 2,299,477, issued October 20, 1942. It is known, however, that this operation gives, in addition to 1,4-dichloro-2-butene, the isomeric 3,4-dichloro-1-butene, the latter being formed in very substantial amounts which usually equal or exceed the amount of the 1,4 isomer [Muskat and Northrup in J. Am. Chem. Soc. 52, 4043, (1930)]. It has heretofore been necessary to separate by fractional distillation the 1,4 compound (B. P. 145° C. at 760 mm.) from its 3,4 isomer (B. P. 115° C. at 760 mm.) as a preliminary step in the preparation of 1,4-dicyano-2-butene. Likewise, if the dibromo compound is used, it has been considered necessary to use the 1,4-dibromo-2-butene.

It is an object of this invention to provide a process for preparing 1,4-dicyano-2-butene from 3,4-dihalo-1-butenes. A further object is to provide a process for preparing 1,4-dicyano-2-butene from a mixture of 3,4-dihalo-1-butenes and 1,4-dihalo-2-butenes. A still further object is to provide a process for preparing 1,4-dicyano-2-butene from a crude halogenation product of butadiene containing 3,4-dihalo-1-butenes and 1,4-dihalo-2-butenes. Other objects will appear hereinafter.

These objects are accomplished by the following invention which comprises cyanating a 3,4-dihalo-1-butene or mixtures thereof with the isomeric 1,4-dihalo-2-butene, wherein the halogen atoms are of atomic weight between 35 and 80, by reacting it with hydrogen cyanide under non-alkaline conditions, that is, in a reaction medium, the liquid phase of which is non-alkaline throughout the reaction. In the preferred embodiment of this invention the reaction is carried out in the presence of a cuprous halide which acts as a catalyst.

It has now been found that under the conditions herein described it is possible to obtain 1,4-dicyano-2-butene from 3,4-dihalo-1-butenes, e. g., 3,4-dichloro-1-butene or from mixtures thereof with the isomeric 1,4-dichloro-2-butene, such as the mixtures which are obtained directly by chlorination of butadiene. In either case the yield of 1,4-dicyano-2-butene is excellent and no evidence is found of the presence of the 3-4-dicyano-1-butene; hence, no special purification of the reaction product is necessary. This result is all the more unexpected in view of the experimental results described in the article by Muskat and Northrup heretofore referred to, wherein it was found that 3,4-dichloro-1-butene did not rearrange to the 1,4 isomer either at room temperature or at 90° C.

Either the dichloro or the dibromobutenes may be used. The dichlorobutenes are cheaper and, therefore, preferred. In the description which follows, the term "dihalobutene" is sometimes used in the interest of brevity. It should be understood that the term refers to either the 1,4-dihalo-2-butenes or the 3,4-dihalo-1-butenes wherein the halogen is chlorine or bromine.

Either 3,4-dihalo-1-butenes or mixtures thereof with 1,4-dihalo-2-butenes may be used as the starting material. The principal advantage of the invention from a practical standpoint is that it permits using mixtures of 3,4- and 1,4-dihalobutenes as they are obtained in the halogenation, e. g., chlorination of 1,3-butadiene. These mixtures usually contain at least 25%, and frequently 50% or more, of 3,4-dihalo-1-butene, whether the chlorination is carried out in the liquid or in the vapor phase. In the most useful embodiment of the invention, the starting material is the crude chlorination product of 1,3-butadiene, that is a mixture containing 3,4-dichloro-1-butene and 1,4-dichloro-2-butene in ratios between about 1:3 and 4:1 and also by-products of the chlorination such as 1,2,3,4-tetrachlorobutane and 1-chloro-1,3-butadiene. These by-products do not interfere with the reaction with hydrogen cyanide.

It is essential in the process of this invention to use a non-alkaline, i. e., neutral or acidic liquid reaction media. It is only when non-alkaline conditions are maintained throughout the reaction that commercially successful yields of 1,4-dicyano-2-butene can be realized. Non-alkaline conditions in the reaction of hydrogen cyanide with the dihalobutenes can be achieved in various ways, several of which are illustrated below. For example, the dihalobutene may be reacted with hydrogen cyanide in the presence of a reactant which neutralizes the hydrogen halide formed without introducing alkalinity. Among such agents, the most useful are the carbonates of metals of group II of the periodic table, for example, the carbonates of magnesium, calcium, zinc, or barium. Another method of conducting the reaction consists in treating the dihalobutene with hydrogen cyanide in the presence of an alkali cyanide, e. g., sodium cyanide, which neutralizes the hydrogen halide and simultaneously forms more hydrogen cyanide. In this case, however, the reaction medium should be substantially anhydrous, that is, it should preferably contain no more water than the small amount (2–3.5%) usually present in commercial hydrogen cyanide, for the reason that alkali cyanides have an alkaline reaction in aqueous media. Alkali cyanides, however, are substantially insoluble in hydrogen cyanide. Yet a third method of carrying out the reaction consists in reacting the dihalobutene with hydrogen cyanide per se without absorbing agents for the hydrogen halide. This method is not the preferred one since it tends to give lower yields than when a group II metal carbonate or an alkali cyanide is present to absorb the hydrogen halide formed. In all of these methods, the liquid phase of the reaction medium, i. e. hydrogen cyanide with or without added diluent, is non-alkaline (neutral to acidic), provided, however, that when an alkali cyanide is used the medium is substantially anhydrous. In all cases the reaction is greatly facilitated by the use of a cuprous halide catalyst.

In the preferred practice of this invention, there is used at least two moles of hydrogen cyanide per mole of dihalobutene, since otherwise the yield in dicyanobutene would be correspondingly reduced. The hydrogen cyanide referred to in the examples is the commercial material which normally contains between 2 and 3.5% of water; or, if desired, there may be used hydrogen cyanide which has been dehydrated and redistilled and which is, for all practical purposes, water-free.

Since the reaction proceeds more smoothly when the mixture is fluid enough to afford maximum contact between liquid and solid reactants, if present, it is desirable to use a liquid diluent. The diluent may be excess hydrogen cyanide, which is a good suspension medium for the solid reactants. Moreover, the presence of excess hydrogen cyanide favors complete reaction of the dihalobutene. Thus the conditions giving optimum yields are those in which an excess of hydrogen cyanide, for example a total of at least 4 moles per mole of dihalobutene, is used. Preferably there is used between about 6 to 10 moles of hydrogen cyanide per mole of dihalobutene, but this ratio may be raised to 12:1 or 15:1 or even more if desired. The excess hydrogen cyanide can, of course, be recovered and recycled.

As has been said, a preferred embodiment of the invention involves the use, as an agent capable of absorbing the hydrogen halide without creating alkalinity, of a carbonate of a metal of group II of the periodic table. For reasons of availability and effectiveness, the preferred carbonates are those of metals having atomic weights below 138. The most useful are the carbonates of calcium, magnesium, and barium, particularly the first named. Preferably there is used at least one mole of carbonate per mole of dihalobutene. Much more can be used if desired, for example up to 3 moles or more, but a large excess of carbonate does not appear to increase the yields.

Another useful embodiment of the invention involves the use, in conjunction with hydrogen cyanide, of an alkali cyanide under substantially anhydrous conditions, that is, in a medium containing no more water than is usually present in commercial hydrogen cyanide. Any alkali metal cyanide can be used, for example potassium or lithium cyanide, but sodium cyanide is preferred. It is believed that the dihalobutene reacts directly with the hydrogen cyanide, the alkali cyanide serving to absorb the resulting hydrogen halide. Regardless of whether or not this theory is correct, it is sufficient to use at least two moles of alkali metal cyanide per mole of dihalobutene, although an excess of alkali cyanide of the order of 10 to 50% is usually desirable. Of course, more can be used if desired.

The reaction is extremely slow at low or ordinary temperature. In order to achieve a practical reaction rate, temperatures below 20° C. should not be used. An optimum temperature range when using hydrogen cyanide alone or with carbonates of group II metals is 100 to 150° C., although higher temperatures, up to the critical temperature of hydrocyanic acid, that is about 183° C., may be used. The higher temperatures are preferable to obtain optimum yields, particularly where a cuprous halide catalyst is not employed in the reaction. When alkali cyanides are used, the temperature should preferably be kept below 100° C., to minimize the tendency of alkali cyanides to hydrolyze or polymerize hydrogen cyanide. In this case the preferred temperature range is between about 40° C. to about 80° C.

Cuprous halides, that is cuprous fluoride, cuprous chloride, cuprous bromide, and cuprous iodide are specific catalysts for this reaction, although cuprous fluoride and cuprous chloride are less effective at the lower temperatures. It is therefore desirable to use a temperature of at least 100° C. when these catalysts are used. The minimum amount of cuprous halide to be used is of the order of about 0.001 mole per mole of dihalobutene. Above this limit the amount of cuprous halide is not very critical, and it may be as high as desired, although no advantage appears to be gained by using more than 0.25 to 0.3 mole of cuprous halide per mole of dihalobutene. The amount of cuprous halide required to achieve a practical rate of reaction decreases as the temperature increases. A satisfactory range is between 0.005 and 0.2 mole of cuprous halide catalyst per mole of dihalobutene. With certain materials of construction which tend to decompose hydrocyanic acid, such as stainless steel, the cuprous halide acts also as a stabilizer. In addition to cuprous halide, metallic copper is also a satisfactory catalyst, probably because it is converted to cuprous halide by the hydrogen halide which forms. The reaction will proceed satisfactorily without catalyst, as illustrated in some of the examples, but in such a case, higher reaction temperatures are necessary for a practical reaction rate.

This invention is further illustrated by the following examples, in which parts are by weight, unless otherwise specified.

Example I

A mixture of 100 parts (1 mole) of powdered calcium carbonate and 10 parts of cuprous bromide was charged into a silver-lined pressure vessel, which was cooled and evacuated. A mixture of 50 parts (0.4 mole) of 3,4-dichloro-1-butene and 85 parts (3.1 moles) of hydrogen cyanide was then drawn into the vessel, which was placed in a shaker assembly and heated at 120° C. for 16 hours. At the end of this time, the vessel was cooled and the excess hydrogen cyanide was removed by distillation. The vessel was then opened and the solid reaction product washed from it with chloroform. The chloroform solution was filtered, the solid extracted with hot benezene, and the combined chloroform and benzene extracts were distilled. There was collected at 95–130° C. at 2 mm. pressure 33.3 parts of 1,4-dicyano-2-butene, representing 78.5% of the theoretical yield. On redistillation the product boiled steadily at 90–91° C. (0.5 mm.). It was further identified by its melting point, 74–75.5° C., mixed melting point with a known sample of 1,4-dicyano-2-butene and hydrolysis with hydrochloric acid to $\Delta^\beta$-dihydromuconic acid, M. P. 193–195° C. The reaction product offered no evidence whatever of the presence of 3,4-dicyano-1-butene.

When Example I was repeated except that only 50 parts (0.5 mole) of calcium carbonate was used, similar results were obtained and the yield of 1,4-dicyano-2-butene was 80.2% of the theoretical.

Example II

Example I was repeated using as the starting material a mixture of equal weights (25 parts each) of 3,4-dichloro-1-butene and 1,4-dichloro-2-butene, each component being the purified, separated isomer. Distillation of the reaction product gave 33.1 parts of 1,4-dicyano-2-butene, a yield of 78% of that calculated. The material was characterized as in the preceding example. No other identifiable reaction product was isolated.

Example III

Example I was repeated using as the starting material 59 parts of the crude product obtained by chlorinating 1,3-butadiene in the vapor phase. The crude chlorination product contained 85% by weight of a 1:1 mixture of 3,4-dichloro-1-butene and 1,4-dichloro-2-butene, the remainder being chiefly 1,2,3,4-tetrachlorobutane with a little 1-chloro-1,3-butadiene. The product of the reaction of this mixed material with hydrogen cyanide, calcium carbonate and cuprous bromide under the conditions of Example I gave, on distillation, 1,4-dicyano-2-butene in amount representing a yield of 72.6% based on the dichlorobutene present. The material was identified as in Example I.

Example IV

A mixture of 50 parts of 3,4-dichloro-1-butene, 50 parts of calcium carbonate and 87 parts of hydrogen cyanide was charged into a silver-lined pressure vessel. The vessel was sealed, placed in a shaking assembly, and heated at 150° C. for 15 hours under autogenous pressure. At the end of this period the vessel was cooled and the reaction mixture was treated as in Example I. The yield of 1,4-dicyano-2-butene was 35.2 parts, or 83% of theoretical. When the above example was repeated except that 25 parts each of 3,4-dichloro-1-butene and 1,4-dichloro-2-butene were used as the starting material, there was obtained 34.2 parts of 1,4-dicyano-2-butene or 81% of theoretical.

Example V

A mixture of 250 parts of 3,4-dichloro-1-butene, 50 parts of cuprous bromide, 245 parts of sodium cyanide, 430 parts of hydrogen cyanide and 400 parts of methanol was heated for 15 hours at 60° C. in a silver-lined pressure vessel. The reaction product was taken up with a solution of 300 parts of 37% hydrochloric acid in 750 parts of water. On distillation of the chloroform layer there was obtained, after removal of the solvent, 28 parts of foreshot containing dichlorobutene, 138 parts (65% of theory) of 1,4-dicyano-2-butene, B. P. 90–110° C. at 1 mm. pressure, M. P. 72–73° C., and 17 parts of still residue.

Instead of using a large excess of hydrogen cyanide, it is possible to employ only the stoichiometrical amount, or a moderate excess thereover, for example 30 to 100% excess. In such a case it is convenient, to achieve the desired fluidity, to use an organic diluent. Suitable diluents include dioxane, benzene, toluene, diethyl ether, acetonitrile, propionitrile and similar essentially neutral liquids. Alcohols such as methanol, ethanol or 2-methoxyethanol may be used even though they tend to participate in the reaction to give alkoxy compounds as by-products.

One way to achieve non-alkalinity when an alkali cyanide is used is to keep the system substantially anhydrous. In this case the preferred mode of operation is that wherein no extra diluent is used, fluidity being secured through the use of excess hydrogen cyanide. Water does not interfere with the reaction provided no alkalinity is developed. It should be noted that the reaction of hydrogen cyanide with a dihalobutene in the presence of a group II metal carbonate produces one mole of water per mole of dihalobutene consumed.

Since hydrogen cyanide boils at 26° C. it is desirable in practice to operate in closed vessels, although when sufficient diluent other than hydrogen cyanide is present, the operation can be conducted at atmospheric pressure with an efficient condensing system. Preferably the mixture is suitably agitated to insure good contact between the reactants. Sufficient time should be allowed for substantially complete reaction of the dihalobutene to obtain optimum results.

The resulting 1,4-dicyano-2-butene is isolated by any suitable method, such as direct distillation from the reaction mixture or preliminary extraction with an appropriate solvent, such as benzene, followed by distillation or crystallization or both of these procedures. It may be purified if desired, but for many purposes purification of the crude product is unnecessary, even when the starting material is the crude butadiene halogenation product.

The compound, 1,4-dicyano-2-butene is of great interest as an intermediate and starting material for intermediates in many syntheses, for example, through conversion to dihydromuconic acid by hydrolysis or to hexamethylenediamine by reduction. The latter compound is one of the principal ingredients of the polyamides generically designated as nylon.

As many apparently widely different embodiments of this invention may be made without departing from the spirit and scope thereof, it is to be understood that this invention is not limited to the specific embodiments thereof except as defined in the appended claims.

We claim:

1. A process for preparing 1,4-dicyano-2-butene which comprises reacting in the liquid phase at a temperature within the range of 40° to 183° C. a 3,4-dihalo-1-butene wherein the halogen atoms are of atomic weight between 35 and 80 with at least two molar equivalents of hydrogen cyanide under acidic conditions throughout the reaction.

2. A process for preparing 1,4-dicyano-2-butene as set forth in claim 1 wherein said process is carried out in the presence of a cuprous halide catalyst in the liquid phase reaction mixture.

3. A process for preparing 1,4-dicyano-2-butene which comprises reacting in the liquid phase at a temperature within the range of 40° to 183° C. a mixture containing 3,4-dichloro-1-butene and 1,4-dichloro-2-butene with at least two molar equivalents of hydrogen cyanide under acidic conditions throughout the reaction.

4. A process for preparing 1,4-dicyano-2-butene which comprises reacting in the liquid phase at a temperature within the range of 40° to 183° C. a chlorinated butadiene mixture containing 3,4-dichloro-1-butene with at least two molar equivalents of hydrogen cyanide under acidic conditions throughout the reaction.

5. A process for preparing 1,4-dicyano-2-butene which comprises reacting in the liquid phase at a temperature within the range of 40° to 183° C. 3,4-dichloro-1-butene with at least two molar equivalents of hydrogen cyanide under acidic conditions throughout the reaction.

6. A process for preparing 1,4-dicyano-2-butene which comprises reacting in the liquid phase at a temperature within the range of 40° to 183° C. a 3,4-dihalo-1-butene wherein the halogen atoms are of atomic weight between 35 and 80 with at least two molar equivalents of hydrogen cyanide under acidic conditions throughout the reaction and in the presence of a carbonate of a metal of group II of the periodic table.

7. A process for preparing 1,4-dicyano-2-butene which comprises reacting in the liquid phase at a temperature within the range of 40° to 183° C. a mixture containing 3,4-dichloro-1-butene and 1,4-dichloro-2-butene with at least two molar equivalents of hydrogen cyanide under acidic conditions throughout the reaction and in the presence of a carbonate of a metal of group II of the periodic table.

8. A process for preparing 1,4-dicyano-2-butene which comprises reacting in the liquid phase at a temperature within the range of 40° to 183° C. a chlorinated butadiene mixture containing 3,4-dichloro-1-butene with at least two molar equivalents of hydrogen cyanide under acidic conditions throughout the reaction and in the presence of a carbonate of a metal of group II of the periodic table.

9. A process for preparing 1,4-dicyano-2-butene which comprises reacting in the liquid phase at a temperature within the range of 40° to 183° C. 3,4-dichloro-1-butene with at least two molar equivalents of hydrogen cyanide under acidic conditions throughout the reaction and in the presence of a carbonate of a metal of group II of the periodic table.

10. A process for preparing 1,4-dicyano-2-butene which comprises reacting in the liquid phase at a temperature within the range of 40° to 183° C. a mixture containing 3,4-dichloro-1-butene and 1,4-dichloro-2-butene with at least two molar equivalents of hydrogen cyanide under acidic conditions throughout the reaction in the presence of calcium carbonate and in the presence of a cuprous halide catalyst.

11. A process for preparing 1,4-dicyano-2-butene which comprises reacting in the liquid phase at a temperature within the range of 40° to 183° C. a chlorinated butadiene mixture containing 3,4-dichloro-1-butene with at least two molar equivalents of hydrogen cyanide under acidic conditions throughout the reaction, in the presence of calcium carbonate and in the presence of a cuprous halide catalyst.

12. A process for preparing 1,4-dicyano-2-butene which comprises reacting in the liquid phase at a temperature within the range of 40° to 183° C. 3,4-dichloro-1-butene with at least two molar equivalents of hydrogen cyanide under acidic conditions throughout the reaction, in the presence of calcium carbonate and in the presence of a cuprous halide catalyst.

13. A process for preparing 1,4-dicyano-2-butene which comprises reacting in the liquid phase at a temperature within the range of 100° to 183° C. 3,4-dichloro-1-butene with at least two molar equivalents of hydrogen cyanide under acidic conditions throughout the reaction and in the presence of calcium carbonate.

14. A process for preparing 1,4-dicyano-2-butene which comprises reacting in the liquid phase at a temperature within the range of 100° to 183° C. 3,4-dichloro-1-butene with at least two molar equivalents of hydrogen cyanide under non-alkaline conditions throughout the reaction, in the presence of calcium carbonate and in the presence of a cuprous bromide catalyst.

JOHN R. JOHNSON.
GERALD M. WHITMAN.

REFERENCES CITED

The following references are of record in the file of this patent:

UNITED STATES PATENTS

| Number | Name | Date |
| --- | --- | --- |
| 1,672,235 | Giles | June 5, 1928 |
| 2,242,084 | Nicodemus et al. | May 13, 1941 |
| 2,342,101 | Cass et al. | Feb. 22, 1944 |
| 2,384,630 | Mahan | Sept. 11, 1945 |
| 2,385,549 | Spence | Sept. 25, 1945 |
| 2,448,755 | Zellner | Sept. 7, 1948 |

FOREIGN PATENTS

| Number | Country | Date |
| --- | --- | --- |
| 708,111 | France | July 20, 1931 |